US011114955B2

United States Patent
Mallineni et al.

(10) Patent No.: US 11,114,955 B2
(45) Date of Patent: Sep. 7, 2021

(54) SELF POWERED WIRELESS SENSOR

(71) Applicant: CLEMSON UNIVERSITY, Clemson, SC (US)

(72) Inventors: Sai Sunil Kumar Mallineni, Clemson, SC (US); Herbert W. Behlow, Clemson, SC (US); Yongchang Dong, Clemson, SC (US); Ramakrishna Podila, Clemson, SC (US); Apparao M. Rao, Clemson, SC (US)

(73) Assignee: Clemson University, Clemson, SC (US)

( * ) Notice: Subject to any disclaimer, the term of this patent is extended or adjusted under 35 U.S.C. 154(b) by 104 days.

(21) Appl. No.: 16/193,099

(22) Filed: Nov. 16, 2018

(65) Prior Publication Data

US 2019/0157992 A1 May 23, 2019

Related U.S. Application Data

(60) Provisional application No. 62/587,717, filed on Nov. 17, 2017.

(51) Int. Cl.
*H02N 11/00* (2006.01)
*H02N 1/04* (2006.01)
(Continued)

(52) U.S. Cl.
CPC ............ *H02N 11/002* (2013.01); *H02J 50/05* (2016.02); *H02J 50/40* (2016.02); *H02N 1/04* (2013.01); *H02J 7/00* (2013.01)

(58) Field of Classification Search
CPC ............ H02N 1/04; H02N 1/00; H02N 1/002; H02N 1/008; H02N 2/00; H02N 2/0065;
(Continued)

(56) References Cited

U.S. PATENT DOCUMENTS 5,844,516 A 12/1998 Viljanen
6,660,959 B2 12/2003 Vallance et al.
(Continued)

FOREIGN PATENT DOCUMENTS

WO WO-03060819 A1 * 7/2003 ............... H01Q 7/00
WO WO 2005/019491 3/2005

OTHER PUBLICATIONS

A Flexible and Transparent Graphene-Based Triboelectric Nanogenerator (Year: 2016).*
(Continued)

*Primary Examiner* — Ahmed Elnakib
(74) *Attorney, Agent, or Firm* — Dority & Manning, P.A.

(57) ABSTRACT

Devices and methods relate to a portable self-powered wireless sensor and transmitter providing a tactile driven electric generator, using a 3D printed nano carbon and polymer electrodes. The device has two electrodes capable of producing greater than 2000 V, which when connected to a metal conductor is sufficient to create an electric field that can be used to wirelessly communicate a signal over a range of a few tens of meters. The sensor is completely self-powered and requires no motors or additional power such as active power supplies, batteries, or capacitors. The sensor generated waveform can be modulated by mechanical action such as hand tapping in a given sequence, which is preserved in the wireless signal (akin to Morse coding) and can be detected by existing compatible commercial electronic receivers. Resulting devices are suitable for security applications requiring wireless transmission of codes.

15 Claims, 9 Drawing Sheets

(51) Int. Cl.
   *H02J 50/40* (2016.01)
   *H02J 50/05* (2016.01)
   *H02J 7/00* (2006.01)
(58) Field of Classification Search
   CPC ........ H02N 2/007; H02N 2/18; H02N 11/002;
                H02J 50/40; H02J 50/05; H02J 7/00
   USPC ...................................... 310/300, 209, 310
   See application file for complete search history.

(56) References Cited

U.S. PATENT DOCUMENTS

| | | | |
|---|---|---|---|
| 6,670,179 | B1 | 12/2003 | Mattson et al. |
| 6,861,785 | B2 | 3/2005 | Andre et al. |
| 6,997,039 | B2 | 2/2006 | Rao et al. |
| 7,144,563 | B2 | 12/2006 | Rao et al. |
| 7,153,452 | B2 | 12/2006 | Ogale et al. |
| 7,456,972 | B2 | 11/2008 | Ke et al. |
| 7,598,723 | B2 | 10/2009 | Gaillard et al. |
| 7,754,183 | B2 | 7/2010 | Keskar et al. |
| 7,818,816 | B1 | 10/2010 | Reppert et al. |
| 8,384,372 | B1 | 2/2013 | Behlow et al. |
| 8,508,108 | B2 | 8/2013 | Anand et al. |
| 9,013,092 | B2 | 4/2015 | Mahapatra et al. |
| 9,419,544 | B2 | 8/2016 | Kim et al. |
| 9,552,929 | B2 | 1/2017 | Roberts et al. |
| 2009/0162277 | A1 | 6/2009 | Ke et al. |
| 2011/0162955 | A1* | 7/2011 | Butzloff ............. B01J 31/06 204/157.15 |
| 2012/0074812 | A1 | 3/2012 | Fujimoto |
| 2014/0084748 | A1* | 3/2014 | Wang ................. H02N 1/04 310/300 |
| 2014/0246951 | A1* | 9/2014 | Wang ................. H02N 1/04 310/310 |
| 2014/0338458 | A1* | 11/2014 | Wang ................. G01H 11/06 73/658 |
| 2015/0001993 | A1* | 1/2015 | Park .................. H02N 2/18 310/319 |
| 2015/0061460 | A1* | 3/2015 | Bae .................. H02N 1/04 310/310 |
| 2016/0040648 | A1* | 2/2016 | Wang ................. H02H 1/04 290/42 |
| 2016/0149518 | A1* | 5/2016 | Wang ................. H02N 1/04 310/310 |
| 2017/0150817 | A1* | 6/2017 | Hung ................. A47B 97/001 |
| 2019/0157992 | A1* | 5/2019 | Mallineni ............ H02N 11/002 |
| 2019/0290164 | A1* | 9/2019 | Vasandani ............ A61N 1/378 |

OTHER PUBLICATIONS

Triboelectric series (Year: 2011).*
Ahmed, et al. "Self-Powered Wireless Sensor Node Enabled by a Duck-Shaped Triboelectric Nanogenerator for Harvesting Water Wave Energy" *Adv. Energy Mater.* 7:1601705 (2016) pp. 1-10.
Chen, et al. "Harmonic-Resonator-Based Triboelectric Nanogenerator as a Sustainable Power Source and a Self-Powered Active Vibration Sensor" *Adv. Mater.* 25 (2013) pp. 6094-6099.
Diaz, et al. "A semi-quantitative tribo-electric series for polymeric materials: The influence of chemical structure and properties" *J. Electrost.* 62(4) (2004) pp. 277-290.
Fan, et al. "Flexible triboelectric generator!" *Nano Energy* 1 (2012) pp. 328-334.
Ferrari, et al. "Raman Spectrum of Graphene and Graphene Layers" *Phys. Rev. Lett.* 97(18) (2006). 187401: pp. 1-4.
Fukada, E. "History and Recent Progress in Piezoelectric Polymers" *IEEE Trans. Ultrason. Ferroelectr. Freq. Control.* 47(6) (2000) pp. 1277-1290.
Garlotta, D. "A Literature Review of Poly(Lactic Acid)" *J. Polym. Environ.* 9(2) (2001) pp. 63-84.
Guo, et al. "Airflow-Induced Triboelectric Nanogenerator as a Self-Powered Sensor for Detecting Humidity and Airflow Rate" *ACS Appl. Mater. Interfaces* 6 (2014) pp. 17184-17189.

Guzhova, et al. "Improvement of polylactic acid electret properties by addition of fine barium titanate" *J. Electrostat.* 79 (2016) pp. 1-6.
Guzhova, et al. "Charge depth in polylactic acid electret filled with fine filler" *Bulgarian Chemical Communications* 47(B) (2015) pp. 103-108.
Hu, et al. "Self-Powered-System with Wireless Data Transmission" *Nano Lett.* 11 (2011) pp. 2572-2577.
Huang, et al. "Human walking-driven wearable all-fiber triboelectric nanogenerator containing electrospun polyvinylidene fluoride piezoelectric nanofibers" *Nano Energy* 14 (2015) pp. 226-235.
Kim, et al. "Ar plasma treated polytetrafluoroethylene films for a highly efficient triboelectric generator" *J. Korean Phys. Soc.* 69(11) (2016) pp. 1720-1723.
Kim, et al. "Highly Stretchable 2D Fabrics for Wearable Triboelectric Nanogenerator under Harsh Environments" *ACS Nano* 9 (2015) pp. 6394-6399.
Kister, et al. "Effects of morphology, conformation and configuration on the IR and Raman spectra of various poly(lactic acid)s" *Polymer* 39(2) (1998) pp. 267-273.
Kuan, et al. "Mechanical and electrical properties of multi-wall carbon nanotube/poly(lactic acid) composites" *J. Phys. Chem. Solids* 69(5-6) (2008) pp. 1395-1398.
Lee, et al. "Transparent flexible stretchable piezoelectric and triboelectric nanogenerators for powering portable electronics" *Nano Energy* 14 (2015) pp. 139-160.
Lin, et al. "A Self-Powered Triboelectric Nanosensor for Mercury Ion Detection" *Angew. Chem.* 52 (2013) pp. 5065-5070.
Malard, et al. "Raman spectroscopy in graphene" *Phys. Rep.* 473 (2009) pp. 51-87.
Mallineni, et al. "Facile and robust triboelectric nanogenerators assembled using off-the-shelf materials" *Nano Energy* 35 (2017) pp. 263-270.
Pan, et al. "Ferroelectric Behavior in Poly-L-Lactic Acid" *Jpn. J. Appl. Phys.* 35 (1996) L1442. (Abstract only).
Park, et al. "Triboelectric series and charging properties of plastics using the designed vertical-reciprocation charger" *J. Electrost.* 66(11-12) (2008) pp. 578-583.
Pu, et al. "Wearable Self-Charging Power Textile Based on Flexible Yarn Supercapacitors and Fabric Nanogenerators" *Adv. Mater.* 28 (2016) pp. 98-105.
Seung, et al. "Nanopatterned Textile-Based Wearable Triboelectric Nanogenerator" *ACS Nano* 9(4) (2015) pp. 3501-3509.
Tajitsu, et al. "Piezoelectric Poly-L-Lactic Acid Film Prepared by a New Method" *Jpn. J. Appl. Phys.* 42 (2003) L6172.
Wang, et al. "A Flexible Fiber-Based Supercapacitor—Triboelectric-Nanogenerator Power System for Wearable Electronics" *Adv. Mater.* 27 (2015) pp. 4830-4836.
Wang, Z.L. "Triboelectric nanogenerators as new energy technology and self-powered sensors—Principles, problems and perspectives" *Faraday Discuss.* 176 (2014) pp. 447-458.
Wang, Z.L. "Triboelectric Nanogenerators as New Energy Technology for Self-Powered Systems and as Active Mechanical and Chemical Sensors" *ACS Nano* 7(11) (2013) pp. 9533-9557.
Wang, et al. "Progress in nanogenerators for portable electronics" *Mater. Today* 15(12) (2012) pp. 532-543.
Wang, et al. "Nanoscale Triboelectric-Effect-Enabled Energy Conversion for Sustainably Powering Portable Electronics" *Nano Lett.* 12 (2012) pp. 6339-6346.
Wen, et al. "Blow-driven triboelectric nanogenerator as an active alcohol breath analyzer" *Nano Energy* 16 (2015) pp. 38-46.
Wu, et al. "Reduced graphene-oxide acting as electron-trapping sites in the friction layer for giant triboelectric enhancement" *Nano Energy* 32 (2017) pp. 542-550.
Yang, et al. "Single-Electrode-Based Sliding Triboelectric Nanogenerator for Self-Powered Displacement Vector Sensor System" *ACS Nano* 7(8) (2013) pp. 7342-7351.
Yang, et al. "Human Skin Based Triboelectric Nanogenerators for Harvesting Biomechanical Energy and as Self-Powered Active Tactile Sensor System" *ACS Nano* 7(10) (2013) p. 9213-9222.
Yang, et al. "Self-Powered Magnetic Sensor Based on a Triboelectric Nanogenerator" *ACS Nano* 6 (2012) pp. 10378-10383.

(56) References Cited

OTHER PUBLICATIONS

Zhang, et al. "Triboelectric nanogenerator as self-powered active sensors for detecting liquid/gaseous water/ethanol" *Nano Energy* 2(5) (2013) pp. 693-701.

Zhang, et al. "Triboelectric nanogenerator built inside clothes for self-powered glucose biosensors" *Nano Energy* 2 (2013) pp. 1019-1024.

Zhao, et al. "Self-Powered Wireless Smart Sensor Node Enabled by an Ultrastable, Highly Efficient, and Superhydrophobic-Surface-Based Triboelectric Nanogenerator" *ACS Nano* 10(9) (2016) pp. 9044-9052.

Zhong, et al. "A paper-based nanogenerator as a power source and active sensor" *Energy Environ. Sci.* 6 (2013) pp. 1779-1784.

Zhou, et al. "Woven Structured Triboelectric Nanogenerator for Wearable Devices" *ACS Appl. Mater. Interfaces* 6 (2014) pp. 14695-14701.

Zhu, et al. "Power-generating shoe insole based on triboelectric nanogenerators for self-powered consumer electronics" *Nano Energy* 2 (2013) pp. 688-692.

Zi, et al. "Maximized Effective Energy Output of Contact-Separation-Triggered Triboelectric Nanogenerators as Limited by Air Breakdown" *Adv. Funct. Mater.* 32 (2017) pp. 542-549.

Zi, et al. "Standards and figure-of-merits for quantifying the performance of triboelectric nanogenerators" *Nat. Commun.* 6:8376 (2015) pp. 1-8.

\* cited by examiner

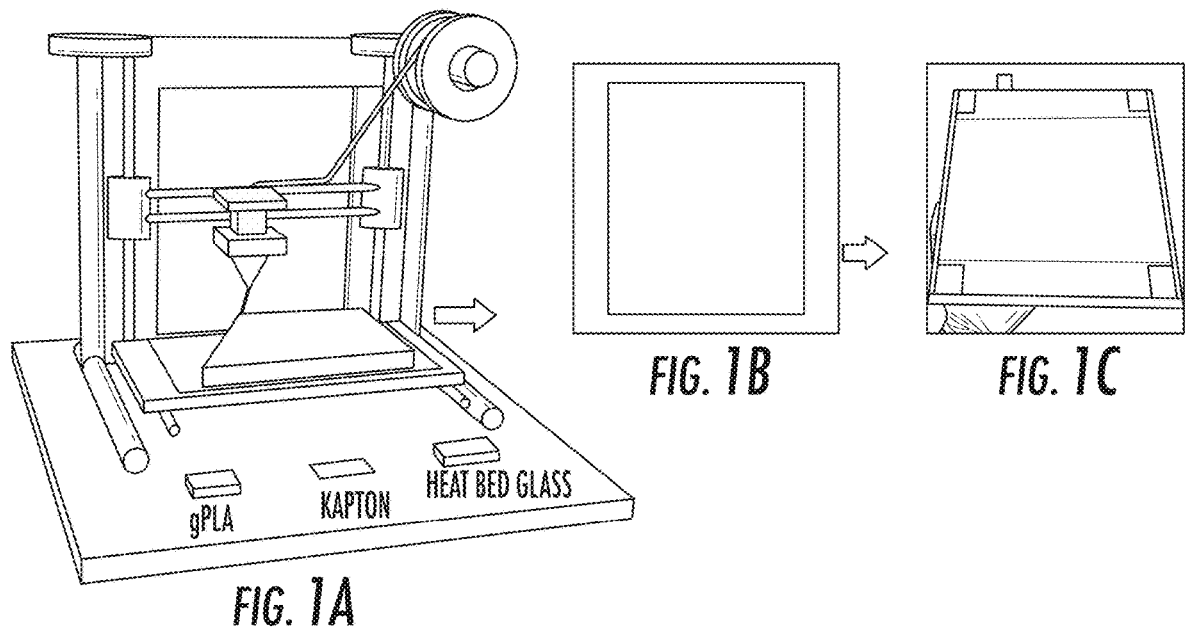
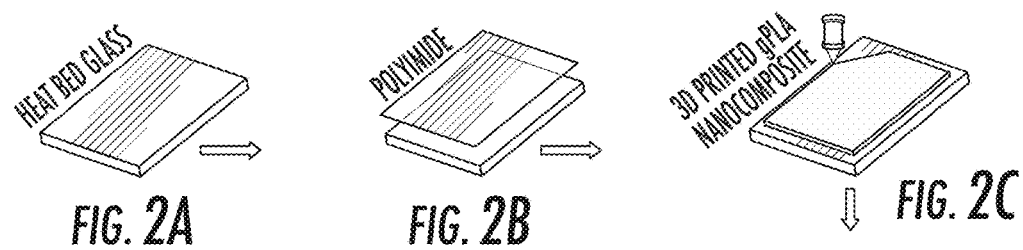
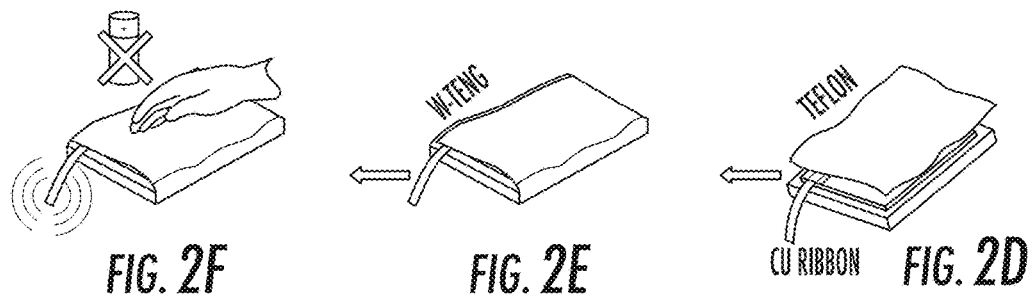

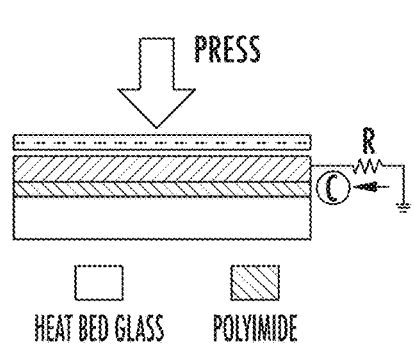
FIG. 4A
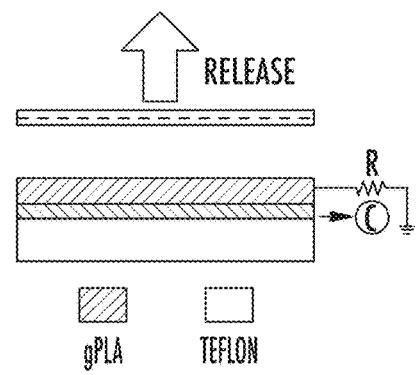
FIG. 4B
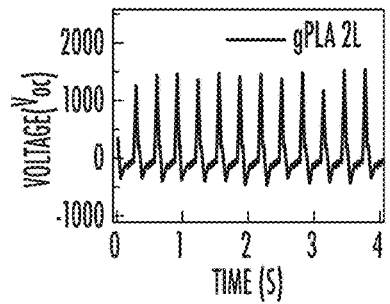
FIG. 4C
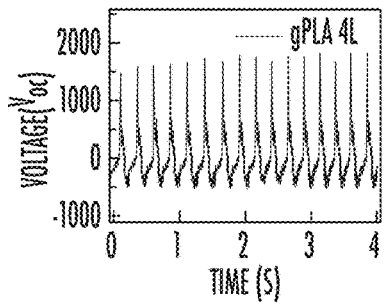
FIG. 4D
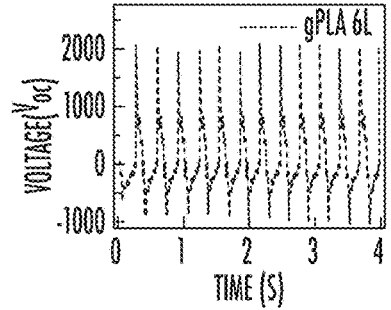
FIG. 4E
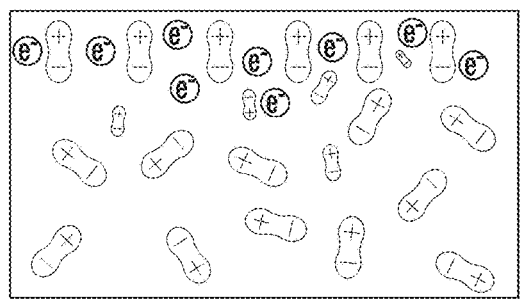
FIG. 5A
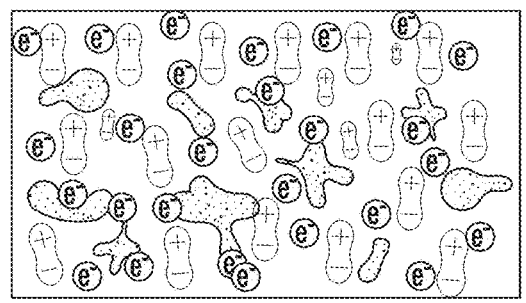
FIG. 5B

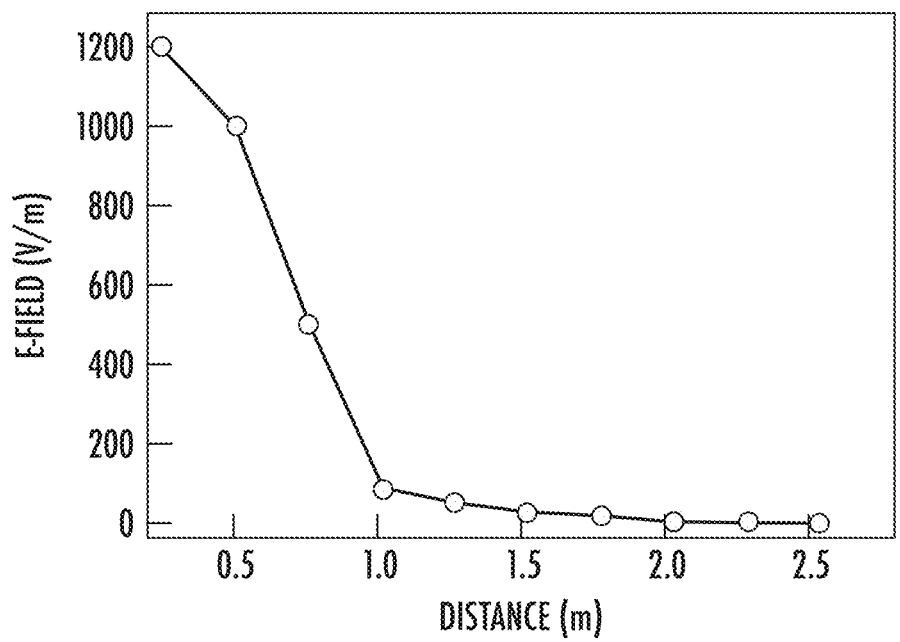
FIG. 14
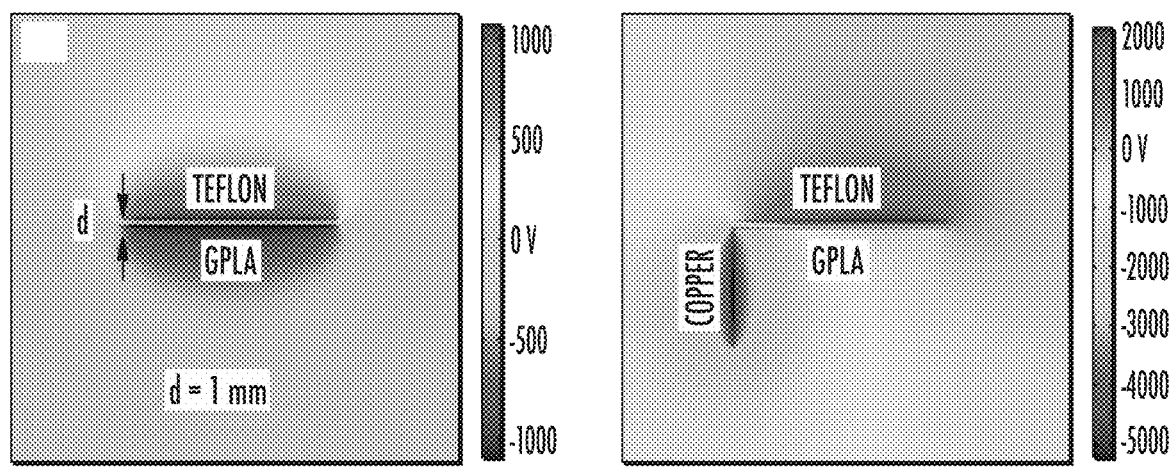
FIG. 15A
FIG. 15B

SELF POWERED WIRELESS SENSOR

PRIORITY CLAIM

The present application claims the benefit of priority of U.S. Provisional Patent Application No. 62/587,717, entitled Self Powered Wireless Sensor, filed Nov. 17, 2017, which is incorporated herein by reference for all purposes.

GOVERNMENT SUPPORT CLAUSE

This invention was made without government grant support.

FIELD

The present disclosure relates generally to self-powered sensors. More particularly, the present subject matter relates to wireless methodology for harvesting mechanical energy via a 3D-printed wireless triboelectric nanogenerator (W-TENG).

BACKGROUND

Wireless sensors can be used in many different applications. For instances, wireless sensors can be used in security alarms. However, wireless sensors currently typically require a power source. Global annual production of very popular alkaline dry cell batteries exceeds over 10 billion units, which produces tremendous landfill waste. Wireless sensors market share is expected to reach over $940 million by 2020. However, since commercially available wireless sensors in the market typically require a power source, a portable, self powered wireless sensor would be a significant need for many applications such as smart electrochromic screens, security alarms, temperature and pressure sensors, IR sensors and similar.

Triboelectricity is emerging as a possible technology for portable electronics, sensors, and other wearable devices. Triboelectric nanogenerators (hereinafter also "TENG"s) harness the contact induced electrostatic potential generated across the surfaces of two dissimilar materials to convert waste mechanical energy into usable electrical energy. For example, triboelectricity comes from frictional generation such as produces electric shock to metal doorknobs after walking on carpet, or after rubbing a rubber ballon in one's hair. Given that many materials such as metals, silk, and wool exhibit triboelectrification, the choice of electrode materials in TENGs is very broad.

The use of triboelectric nanogenerators (TENGs) potentially have various advantages over batteries, with a basic comparison of aspects of the two technologies broadly referenced in Table 1 herewith, as follows:

TABLE 1

| Battery | Triboelectric nanogenerator |
|---|---|
| Has two separate electrodes viz. cathode and anode. | Has two separate electrodes viz electropositive and electronegative |
| The electrodes are separated by an electrolyte. | The electrodes are separated by an air gap. |
| Electrochemical reactions produce the electric potential between the electrodes. | Induced friction between two electrodes generates static charges that produces electric potential |

The materials pair in a TENG may be often chosen so as to maximize the potential drop while allowing easy flow of charges (i.e., less electrical resistance) to harvest usable power. In recent years, various TENG embodiments have demonstrated using pairs of different patterned nanomaterials and polymers. Notwithstanding such progress, various issues remain with respect to how eco-friendly and high-performance TENGs might be realized for wirelessly transmitting energy, i.e., without the need for hardwiring TENGs for energy storage. Therefore, needs remain to identify earth-abundant, biodegradable, and recyclable materials (e.g., biopolymers) that are suitable for realizing sustainable and ecofriendly TENGs with high output electric fields for wireless transmission of harvested energy.

It has been previously determined that crystallographic symmetry is critical in determining the tribo- and piezoelectrical properties of materials. See, for example, E. Fukada, IEEE Trans. Ultrason. Ferroelectr. Freq. Control. 2000, 47, 1277 (incorporated herein for all purposes). Using crystal symmetry, Fukada and co-workers established that effective polarization could be achieved in biopolymers when polar groups are linked to one of their asymmetric carbon atoms. Polylactic acid (PLA), which is a plant-derived biodegradable linear aliphatic thermoplastic polyester, contains two asymmetric carbon atoms that facilitate a high degree of polarization upon triboelectrification. Unfortunately, the high electrical resistance makes PLA unsuitable as a TENG electrode. See, also, Q. Y. Pan, S. Tasaka, N. Inagaki, Jpn. J. Appl. Phys. 1996, 35, 1442; Y. Tajitsu, M. Sukegawa, M. Kikuchi, N. Sudo, M. Kudo, T. Masuko, M. Date, E. Fukada, Jpn. J. Appl. Phys. 2003, 42, 6172; and D. Garlotta, J. Polym. Environ. 2002, 9, 63, all of which are fully incorporated herein by reference.

Patent literature has addressed generator device technology. For example, U.S. Pat. No. 9,419,544 discloses an energy harvesting device that includes an energy generation layer. The energy associated with touching (e.g., applying pressure to) the energy generation layer can be harvested to provide sustainable power. The energy generation layer includes a piezoelectric film comprised of Zinc oxide (ZnO), Gallium Nitride (GaN), Zinc Magnesium oxide (ZnMgO), Indium Nitride (InN), BTO, PZT, PVDF, or a polymer including piezoelectric nanoparticles. Such patent uses piezoelectric materials (electricity generation from mechanical stress/pressure) as a main energy generating source, with a generated output on the order of 1-2 volts. Such patent does not appear to make use of triboeletric materials, and does not appear to disclose use of graphene and/or polylactic acid to form an energy harvesting device, specifically an energy generation layer.

U.S. Pat. No. 9,013,092 discloses a sensor-based energy harvesting device including a polymer and an electrode coupled to opposing sides of the polymer. When the polymer is subjected to an oscillatory bending motion, an electrical potential is generated and harvested to produce sustainable power. However, such patent does not appear to disclose use of graphene and/or polylactic acid to form an energy harvesting device, specifically the polymer.

U.S. Pat. No. 8,508,108 discloses an energy harvesting device said to be suitable for powering biological implants, wireless sensors, and wearable devices. The energy harvesting device includes an ionic polymer-metal composite (IPMC) thin film and a metal electrode coupled to opposing sides of the IPMC thin film. When the IPMC thin film is subjected to a bending motion, an electrical potential is generated between the metal electrodes. In addition, such patent appears to disclose an embodiment in which the IPMC includes a graphitic coating. However, such patent does not appear to disclose use of graphene and polylactic acid to form the energy harvesting device, specifically the IPMC thin film.

Thus, a need exists for improved power sources with renewable and eco-friendly materials generally, and in particular for improved wireless triboelectric nanogenerator (W-TENG) technology.

SUMMARY

Aspects and advantages of embodiments of the present disclosure will be set forth in part in the following description, or may be learned from the description, or may be learned through practice of the embodiments.

In general, it is a present object to provide improved self-powered arrangements. More particularly, it is an object to provide wireless methodology for harvesting mechanical energy via a 3D-printed wireless triboelectric nanogenerator (W-TENG). arrangements, and associated methodology. It is a more particular object, in some instances, to provide an improved harvesting of potentially wasted energy that is being produced by ambient vibration, for other effective uses. In some instances, harvested energy may be used to power circuits, for example, for powering an electrical sensor load and for wireless transmission therefrom.

It is also a present object to provide for providing devices which are portable, self powered, and real-time wireless capable.

It is another present object to provide technology which is robust, and has essentially unlimited life cycles of use (for example, in excess of 100,000 cycles).

One presently disclosed exemplary embodiment of the presently disclosed subject matter relates to a portable self-powered wireless sensor and transmitter. Such wireless sensor and transmitter in some embodiments may be comprised of a tactile driven electric generator, using a 3D printed nano carbon and polymer electrodes. Such device preferably does not contain any motors or active power supply (e.g., batteries, capacitors).

In some embodiments, some presently disclosed devices may include two electrodes capable of producing greater than 2000 V, which when connected to metal conductor is sufficient to create an electric field that can be used to wirelessly communicate a signal over a range of a few tens of meters. Such a sensor may be completely self-powered and requires no additional power. An additional attribute may be that the waveform generated by the disclosed sensor can be modulated by mechanical action such as hand tapping in a given sequence. Such waveform may be preserved in the wireless signal (akin to Morse coding) and can be detected by existing compatible commercial electronic receivers. Thus, presently disclosed technology leads to devices that are suitable, for example, for security applications requiring wireless transmission of codes.

Another presently disclosed exemplary embodiment may relate to a "wireless" paradigm for harvesting mechanical energy via a 3D-printed wireless triboelectric nanogenerator (W-TENG) comprised of an ecofriendly graphene polylactic acid (gPLA) nanocomposite and Teflon (polymerized tetrafluoroethylene). One example of such a W-TENG may generate a very high output voltages >2 kV with a strong electric field that enables the wireless transmission of harvested energy over a distance of 3 m. Such a W-TENG embodiment may in some instances exhibit an instantaneous peak power up to 70 mW that could be wirelessly transmitted for storage into a capacitor obviating the need for hard-wiring or additional circuitry.

In some other instances, per presently disclosed subject matter, the use of W-TENG for wireless and secure actuation of smart-home applications such as smart tint windows, temperature sensors, liquid crystal displays, and security alarms either with a single or a specific user-defined passcode of mechanical pulses (e.g., Fibonacci sequence) may be provided. The scalable additive manufacturing approach for gPLA-based W-TENGs, along with their high electrical output and unprecedented wireless applications, may be highly advantageous for mechanical energy harvesting technologies.

Further, presently disclosed subject matter shows advantages through, in some embodiments, use of electrically conducting graphene-PLA (gPLA) nanocomposites to additively manufacture sustainable TENG electrodes with high output voltages (>2 kV) and high output powers (>70 mW). Graphene is an advantageous filler per presently disclosed subject matter for improving electrical conducting properties of PLA because it: (1) can store injected electrical charges with a decay time≈40 min (which is an order of magnitude higher than decay times in oxides), (2) leads to high electrical conductivity (volume resistivity≈0.6 $\Omega$cm) at low filler content≈15 wt %, and (3) improves the mechanical robustness of PLA.

The presently disclosed subject matter may be used as self-powered wireless and portable sensors employed in various applications such as smart homes, electrochromic windows, anti-theft systems, digitally transmit secret codes or similar, and applicable to potential industries such as energy, defense, housing, and security industries, and of interest to both government and corporate entities.

Unlike any conventional TENG hardwired to power a commercial wireless transmitter, a W-TENG per presently disclosed subject matter can wirelessly control a variety of electronic gadgets (e.g., electrochromic windows, temperature sensors, liquid crystal displays, and security alarms for smart-home applications) in real time, obviating the need for either of additional amplification or commercial wireless transmitters. Unlike wireless transmitters with external power systems (e.g., through batteries), W-TENGs as presently disclosed represent a renewable self-powered alternative that can activate an electronic circuit by simple mechanical motion such as hand tapping.

Further, presently disclosed exemplary embodiments demonstrate that electrical energy generated from mechanical energy imparted to a W-TENG can be wirelessly transmitted and stored in a capacitor. All the above attributes make presently disclosed W-TENG subject matter a viable green alternative for wirelessly powering, for example, the internet of things.

One presently disclosed exemplary embodiment relates to a triboelectric nanogenerator (TENG), comprising a pair of oppositely facing bottom and top electrodes of dissimilar materials for producing contact induced electrostatic potential across the surfaces of such electrodes to convert mechanical energy applied thereto into usable electrical energy. Preferably, for such combination, such bottom electrode comprises a combination of graphene and one of polylactic acid (PLA) and a polymer formed as a graphene nanocomposite on a substrate; and such top electrode comprises one of Teflon, Polyvinylidene fluoride, two-dimensional Ti2C3Tx, and fluorographene.

Another presently disclosed exemplary embodiment relates to a self-powered wireless triboelectric nanogenerator (W-TENG), comprising a substrate; a pair of oppositely facing bottom and top electrodes of dissimilar materials comprising nano carbon and polymer based electrodes; and a metallic ribbon antenna associated with such bottom electrode for directly wirelessly transmitting electrical energy from such W-TENG to an associated receiving wireless device, without any active power supply, based on contact induced electrostatic potential across the surfaces of such dissimilar materials electrodes to convert mechanical energy applied thereto into usable electrical energy.

It is to be understood that the presently disclosed subject matter equally relates to associated and/or corresponding methodologies. One exemplary such method relates to methodology for scalable additive production for a self-powered wireless triboelectric nanogenerator (W-TENG). Such methodology preferably comprises applying a polyimide film to a supporting substrate; 3-D printing a graphene nanocomposite bottom electrode layer on such polyimide film; associating a metallic ribbon antenna with such bottom electrode layer; and placing a top electrode layer above such bottom electrode layer and having a dissimilar material to that of such bottom electrode layer so as to produce contact induced electrostatic potential across the surfaces of such dissimilar materials electrode layers to convert mechanical energy applied thereto into usable electrical energy. Per such methodology, such metallic ribbon antenna directly wirelessly transmits electrical energy from such W-TENG to an associated receiving wireless device, without requiring any active power supply.

Additional objects and advantages of the presently disclosed subject matter are set forth in, or will be apparent to, those of ordinary skill in the art from the detailed description herein. Also, it should be further appreciated that modifications and variations to the specifically illustrated, referred and discussed features, elements, and steps hereof may be practiced in various embodiments, uses, and practices of the presently disclosed subject matter without departing from the spirit and scope of the subject matter. Variations may include, but are not limited to, substitution of equivalent means, features, or steps for those illustrated, referenced, or discussed, and the functional, operational, or positional reversal of various parts, features, steps, or the like.

Still further, it is to be understood that different embodiments, as well as different presently preferred embodiments, of the presently disclosed subject matter may include various combinations or configurations of presently disclosed features, steps, or elements, or their equivalents (including combinations of features, parts, or steps or configurations thereof not expressly shown in the figures or stated in the detailed description of such figures). Additional embodiments of the presently disclosed subject matter, not necessarily expressed in the summarized section, may include and incorporate various combinations of aspects of features, components, or steps referenced in the summarized objects above, and/or other features, components, or steps as otherwise discussed in this application. Those of ordinary skill in the art will better appreciate the features and aspects of such embodiments, and others, upon review of the remainder of the specification, and will appreciate that the presently disclosed subject matter applies equally to corresponding methodologies as associated with practice of any of the present exemplary devices, and vice versa.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

A full and enabling disclosure of the presently disclosed subject matter, including the best mode thereof, directed to one of ordinary skill in the art, is set forth in the specification, which makes reference to the appended figures, in which:

FIG. 1A illustrates a representative schematic of additive manufacturing of a W-TENG bottom electrode in accordance with presently disclosed subject matter, with the active material for the W-TENG electrode, namely, a graphene-PLA (gPLA) filament spool, is fed to the extrusion nozzle that prints computer-designed 3D patterns on the substrate;

FIG. 1B represents a printed bottom electrode for an exemplary W-TENG embodiment of the presently disclosed subject matter;

FIG. 1C represents a fully assembled W-TENG exemplary embodiment of the presently disclosed subject matter with a copper ribbon attached to the bottom electrode, and a Teflon sheet as the top electrode;

FIG. 2A, FIG. 2B, FIG. 2C, FIG. 2D, FIG. 2E, and FIG. 2F represent a detailed step-by-step fabrication or assembly process of the exemplary W-TENG as represented in subject FIG. 1A, FIG. 1B, and FIG. 1C;

FIG. 4A and FIG. 4B show respective schematics of a working mechanism of an exemplary W-TENG embodiment of presently disclosed subject matter, showing periodic pressing and releasing, respectively, of the top electrode (Teflon), resulting in generation of positive and negative voltage peaks, respectively;

FIG. 4C, FIG. 4D, FIG. 4E represent the dependence of an exemplary presently disclosed W-TENG's open circuit output voltage on the thickness of the bottom electrode thereof, including with 2L, 4L, 6L representing two, four, and six layers of printed gPLA electrodes whose thicknesses are ≈1, 2, 3 mm, respectively;

FIG. 5A and FIG. 5B represent induced polarization in the polar PLA and gPLA, respectively, bottom electrodes of a presently disclosed exemplary embodiment when placed in the vicinity of a negatively charged top electrode;

FIG. 11 represents the use of a presently disclosed exemplary W-TENG embodiment for actuating smart home applications such as, smart-tint windows, photoframes, LED displays, calling bell/security alarm, and similar;

FIG. 14 represents exemplary spatial variation of an exemplary electric field generated by a presently disclosed exemplary W-TENG embodiment as a function of distance;

FIG. 15A and FIG. 15B show, respectively, electric field distribution in a presently disclosed exemplary W-TENG embodiment without and with an attached Cu ribbon.

Figure 3A:
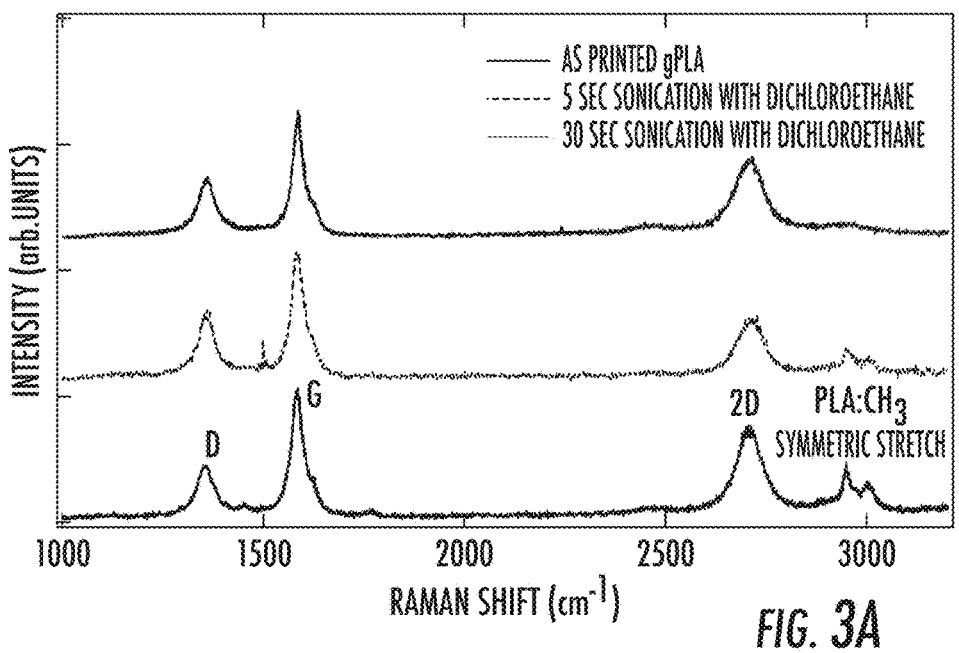
FIG. 3A is a Raman spectrum illustration of the bottom electrode of the exemplary embodiment of FIG. 1A, FIG. 1B, and FIG. 1C which shows the G-, D-, and 2D-bands of graphene along with $CH_3$ symmetric stretch modes of PLA.

Repeat use of reference characters in the present specification and drawings is intended to represent the same or analogous features or elements or steps of the presently disclosed subject matter.

DETAILED DESCRIPTION

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

Presently disclosed devices and corresponding and/or associated methods relate to a portable self-powered wireless sensor and transmitter providing a tactile driven electric generator, using a 3D printed nano carbon and polymer electrodes. The device has two electrodes capable of producing greater than 2000 V, which when connected to a metal conductor is sufficient to create an electric field that can be used to wirelessly communicate a signal over a range of a few tens of meters. The sensor is completely self-powered and requires no motors or additional power such as active power supplies, batteries, or capacitors. The sensor generated waveform can be modulated by mechanical action such as hand tapping in a given sequence, which is preserved in the wireless signal (akin to Morse coding) and can be detected by existing compatible commercial electronic receivers. Resulting devices are suitable for security applications requiring wireless transmission of codes.

Various advantages and technical achievements are provided by practice of various exemplary embodiments disclosed herewith. For example, by using a combination of 3D-printable graphene-PLA and Teflon, voltages above 2000 V can be generated by a simple mechanical motion such as hand tapping the device. In addition to graphene-PLA, other 3D-printable graphene composites with polymers such as Polyethylene terephthalate, Polycarbonate, Acrylonitrile Butadiene Styrene, and nylon can be used. For yet other embodiments, Teflon can also be replaced with Polyvinylidene fluoride, two-dimensional $Ti_2C_3T_x$, and fluorographene.

For still other presently disclosed exemplary embodiments, the energy generated by a presently disclosed device (when tapped) can be directly wirelessly transmitted (in real time) up to 3 m to actuate wireless sensors without any booster or additional energy storage device.

Still further, for some embodiments, a presently disclosed device enables real-time wireless charging of a capacitor without involving additional energy storage devices such as a capacitor or a battery.

Yet further, the electrical output waveform generated can be modulated (again in real-time) by the input mechanical energy. Such feature can be used for applications such as Morse coding or similar coded transmissions.

The present disclosure describes for some embodiments additively manufactured gPLA nanocomposite-based high-performance TENGs that not only convert mechanical energy into electricity but also wirelessly (W-TENG) transmit the generated energy without the need for either additional circuitry or external electrical power. A 3D-printed gPLA nanocomposite on a polyimide (or Kapton) film may be used with a complementary polytetrafluoroethylene (PTFE or Teflon) sheet to fabricate a gPLA-based TENG as shown in FIG. 1A. When actuated by simple mechanical motions such as hand tapping, the W-TENG generated high output voltage (>2 kV) and peak power (>70 mW at 10 MΩ). An estimated force from hand tapping was ≈120 N and was applied at an average frequency of ≈3 Hz to activate W-TENG.

Furthermore, per an exemplary embodiment as presently disclosed, the high output voltage (which resulted in a high electric field at the end of the copper ribbon attached to the gPLA electrode) was effective in enabling wireless transmission of the electric field over a distance of 3 m.

FIG. 1A is a schematic of additive manufacturing of an exemplary presently disclosed W-TENG bottom electrode. The active material for the W-TENG electrode, namely, the gPLA filament spool, is fed to the extrusion nozzle that prints computer-designed 3D patterns on the substrate. FIG. 1B is a printed bottom electrode for such exemplary W-TENG embodiment, and FIG. 1C is a fully assembled exemplary W-TENG with a copper ribbon attached to the bottom electrode, and a Teflon sheet as the top electrode.

FIG. 2A, FIG. 2B, FIG. 2C, FIG. 2D, FIG. 2E, and FIG. 2F represent a detailed step-by-step fabrication or assembly process of the exemplary W-TENG as represented in subject FIG. 1A, FIG. 1B, and FIG. 1C;

In this exemplary embodiment, as illustrated, gPLA feedstock is heated above its glass transition temperature (Tg=55° C.) and extruded through the 3D printer nozzle (FIG. 1A) to rapidly print multiple gPLA layers ($\approx$16×18 cm2) on a thin polyimide (or Kapton) film (thickness$\approx$60 μm) attached to a borosilicate heat-print-bed glass. Such assembly constitutes the bottom electrode for the presently disclosed W-TENG. Narrow strips of Kapton tape are then used to attach a Cu ribbon to the printed gPLA, and a Teflon sheet to the bottom electrode to yield a W-TENG (FIG. 1C). High electronegativity was a technical consideration for using Teflon, which can readily accept electrons when rubbed against other surfaces. In the W-TENG embodiment portion depicted in FIG. 1C, the buckling of the top Teflon sheet resulted in a natural air gap ($\approx$1 mm) between the top and bottom electrodes obviating the need for any additional spacers.

FIG. 3A is a Raman spectrum illustration of the bottom electrode of the exemplary embodiment of FIG. 1A, FIG. 1B, and FIG. 1C which shows (see lower trace of FIG. 3A) the G-, D-, and 2D-bands of graphene along with $CH_3$ symmetric stretch modes of PLA. As shown in FIG. 3A, the Raman spectrum of the gPLA electrode shows the characteristic graphitic, or G-band ($\approx$1585 cm-1), along with the disorder, or D-band ($\approx$1350 cm-1), and its overtone 2D band ($\approx$2700 cm-1). The subject graph (towards right hand end of lower trace) also shows evidence of the $CH_3$ symmetric stretching modes of PLA$\approx$2900 cm-1 in addition to the Raman features of graphene.

FIG. 3A also compares Raman spectra of pristine- and dichloroethane-treated gPLA. The lower trace of FIG. 3A shows the pristine sample, while the middle trace shows results of 5 seconds of sonication with dichloroethane, and while the top trace shows results of 30 seconds of sonication with dichloroethane. The characteristic $CH_3$ symmetric stretch bands (per the lower trace right hand end) were absent in Raman spectrum (middle and top traces) of the treated gPLA as PLA was etched by dichloroethane.

Figure 3B:
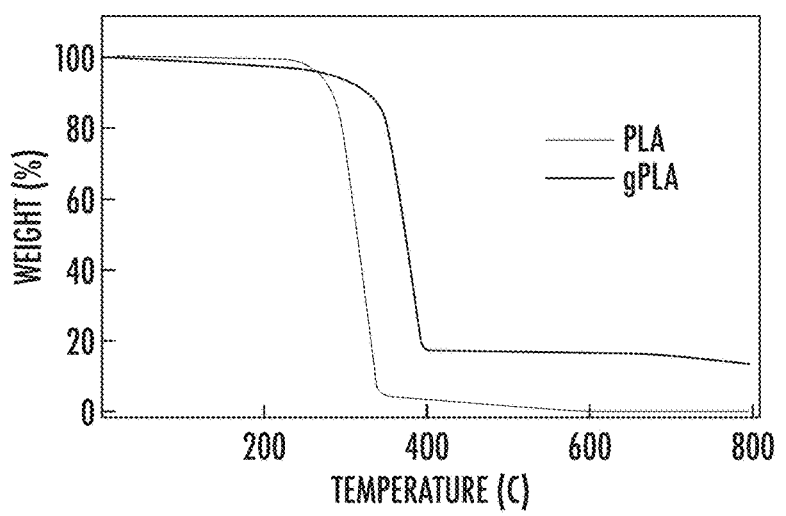
FIG. 3B shows thermogravimetric analysis (TGA) imagery of bottom electrodes prepared from PLA and gPLA filaments.

FIG. 3B shows thermogravimetric analysis (TGA) imagery of bottom electrodes prepared from PLA and gPLA filaments. Thermogravimetric analysis or thermal gravimetric analysis (TGA) is a method of thermal analysis in which the mass of a sample is measured over time as the temperature changes.

The FIG. 3B graphed thermogravimetric analysis (TGA) of the PLA and gPLA electrodes show a clear decrease in weight at temperatures$\approx$270 and $\approx$340° C., respectively, due to the decomposition of PLA. The presence of graphene in the PLA matrix clearly increased the structural stability of the gPLA electrode. Similar enhancements in the structural composition may be observed with the addition of carbon nanotubes (CNTs) into the PLA polymer matrix. Unlike PLA electrodes, gPLA electrodes showed $\approx$15-17% weight retention above 400° C. due to the presence of graphene, which was confirmed by the Raman spectrum of gPLA electrode subjected to 800° C. during TGA.

Figure 3C:
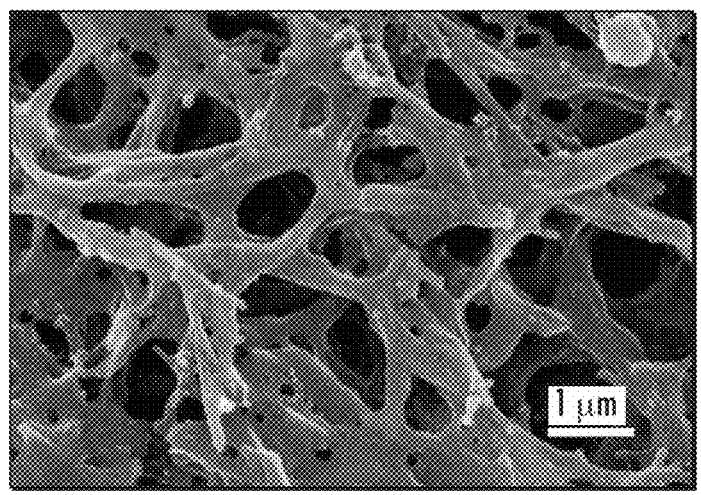
FIG. 3C shows scanning electron microscopy (SEM) imagery showing highly porous matrix of gPLA bottom electrode.

FIG. 3C shows scanning electron microscopy (SEM) imagery showing highly porous matrix features of the gPLA bottom electrode of a presently disclosed W-TENG.

FIG. 4A and FIG. 4B show respective schematics of a working mechanism of an exemplary W-TENG embodiment of presently disclosed subject matter, showing periodic pressing and releasing, respectively, of the top electrode (Teflon), resulting in generation of positive and negative voltage peaks, respectively.

The exemplary W-TENG embodiment is initially in a mechanically neutral state with no potential difference across the electrodes. The top electrode is negatively charged when it is "pressed" against the bottom electrode by a mechanical force, such as hand tapping or other applied mechanical force. The top surface of gPLA is oxidized leading to a surface polarization. Upon releasing the mechanical force, the negatively charged Teflon sheet relaxes to its initial configuration, and further polarizes the bottom gPLA electrode leading to a measurable mean potential difference >1.5 kV (see FIG. 4C, FIG. 4D, and FIG. 4E). Such enhanced output voltages were not observed when the bottom electrode was printed using a PLA filament.

FIG. 4C, FIG. 4D, and FIG. 4E represent the result that for an exemplary presently disclosed W-TENG embodiment, its open circuit output voltage is dependent on the thickness of the bottom electrode thereof. As shown, the three respective graphs include 2L, 4L, 6L examples, representing two, four, and six layers of printed gPLA electrodes whose thicknesses are $\approx$2, 3 mm, respectively.

FIG. 5A and FIG. 5B represent induced polarization in the polar PLA and gPLA, respectively, bottom electrodes of a presently disclosed exemplary embodiment when placed in the vicinity of a negatively charged top electrode. While, the triboelectric charges in PLA are confined at the surface, it extends throughout the bulk in gPLA due to the presence of graphene resulting in boosted output voltages. Also, while the surface dipoles on PLA become oriented under the influence of negatively charged Teflon, the dipoles within its bulk remain randomly oriented due to the lack of charge flow and hindered mobility of polymer macromolecules. See FIG. 5A.

The voltage increase in gPLA electrode based TENG is due to the presence of graphene, which enhances the triboelectric charge density (see FIG. 5B). In TENGs the value of the voltages generated is proportional to charge density by the relation $V=\sigma x(t)/\varepsilon$, where V is open circuit voltage, $\sigma$ is the charge density, and x is the separation between the electrodes at given time t. Similar enhancement in TENG output voltage was observed upon addition of reduced graphene oxide (rGO) in polyimide composite. Such enhancement may be due to additional charge trapping sites created by graphene in the dielectric matrix. To further confirm such assertion, the gPLA electrode surface was etched using dichloroethane to remove the top layer of PLA on the surface of the electrode. As noted above re comparison graph traces of FIG. 3A, the $CH_3$ stretching modes$\approx$2900 cm-1 which were present in the as-printed gPLA electrode, were absent in the Raman spectrum of dichloroethane-treated gPLA electrode, thus confirming the removal of the PLA from the surface and exposure of the graphene.

Figure 6A:
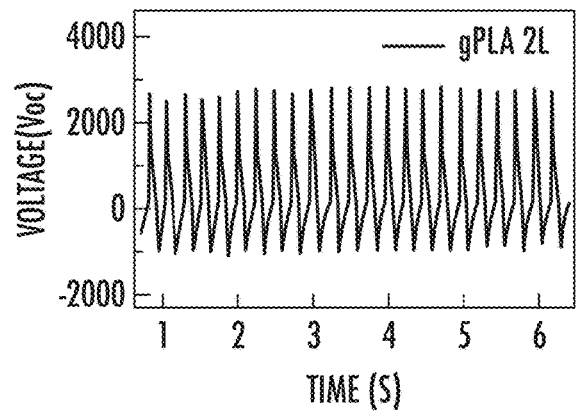
FIG. 6A and FIG. 6B illustrate open circuit voltages ($V_{oc}$) generated by (FIG. 6A) 2L gPLA electrode-based exemplary presently disclosed W-TENG embodiment, which is reduced upon treating the electrode with dichloroethane (FIG. 6B)
Figure 6B:
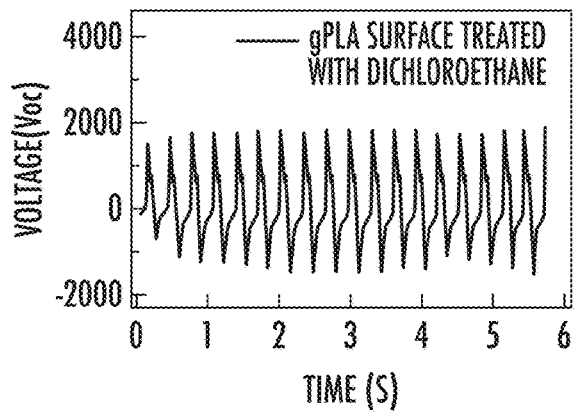
Figure 7:
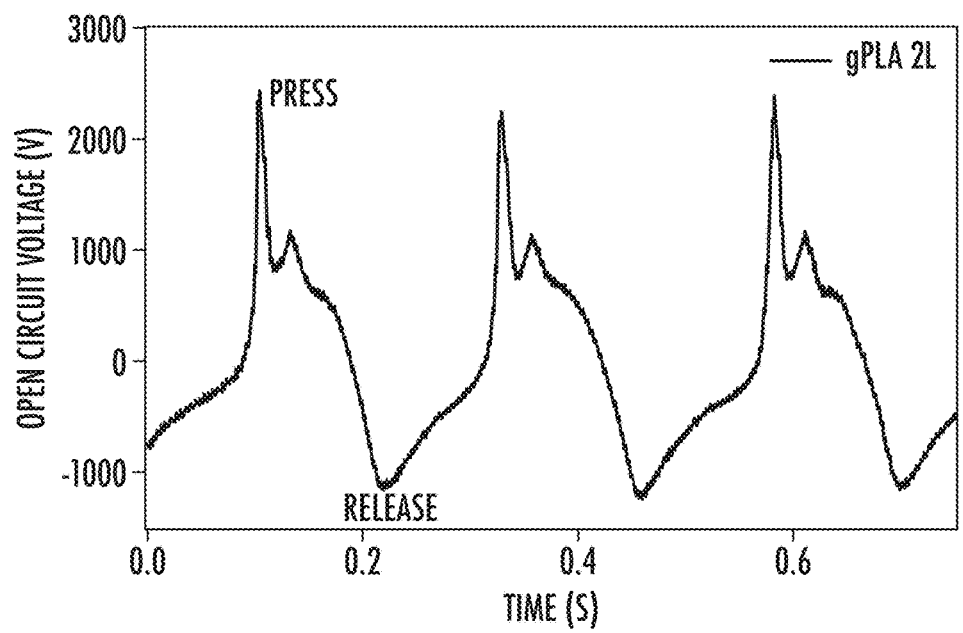
FIG. 7 is an enlarged view of open circuit voltages generated by 2L gPLA electrode-based exemplary presently disclosed W-TENG embodiment (as in FIG. 6A), and clearly illustrating "press" and "release" cycles from W-TENG operations.

FIG. 6A and FIG. 6B illustrate open circuit voltages (Voc) generated by (FIG. 6A) 2L gPLA electrode-based exemplary presently disclosed W-TENG embodiment, which is reduced upon treating the electrode with dichloroethane (FIG. 6B). FIG. 7 is an enlarged view of open circuit voltages generated by 2L gPLA electrode-based exemplary presently disclosed W-TENG embodiment (as in FIG. 6A). The enlarged trace clearly illustrates "press" and "release" cycles (as also marked) as far as voltage outputs from W-TENG operations. However, the W-TENGs with dichloroethane-treated gPLA electrodes showed ≈1.8 kV, which is ≈33% lower than the voltage exhibited by the as-printed gPLA electrode (2.7 kV).

Figure 8A:
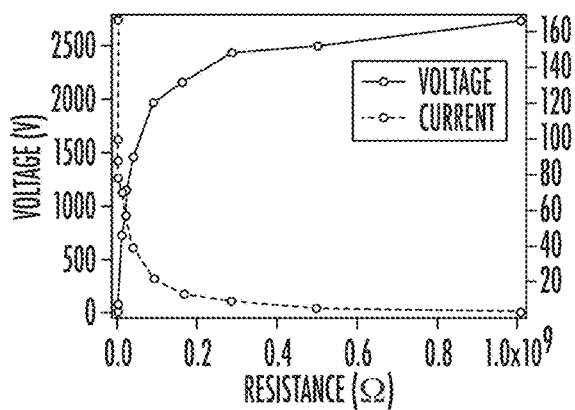
FIG. 8A illustrates resistive load characterization of a presently disclosed exemplary W-TENG embodiment with peak voltages (the upward tracking trace) and currents (the downward tracking trace) with varying load resistances
Figure 8B:
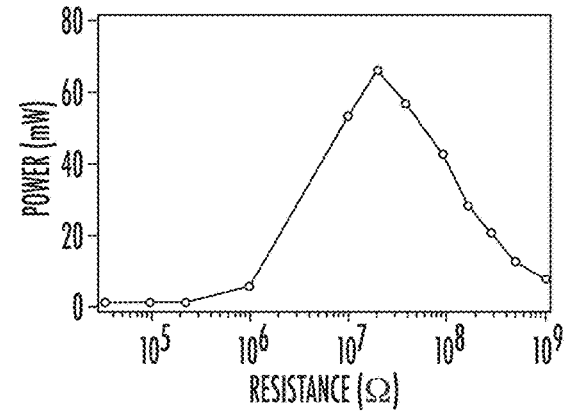
FIG. 8B illustrates peak power of ~70 mW generated by a presently disclosed exemplary W-TENG embodiment.

FIG. 8A illustrates resistive load characterization of a presently disclosed exemplary W-TENG embodiment with peak voltages (the upward tracking trace) and currents (the downward tracking trace) with varying load resistances. FIG. 8B illustrates peak power of ~70 mW generated by a presently disclosed exemplary W-TENG embodiment.

While FIG. 8A shows a detailed electrical characterization of the W-TENGs hardwired to varying loads, with no significant current drawn from the PLA electrodes, the improved electrical conductivity of gPLA electrodes (FIG. 8B) facilitated a current flow with a peak power≈70 mW, as illustrated. The presence of graphene in the PLA matrix makes the whole nanocomposite electrically conducting, and a significant current could be drawn with short-circuit charge transfer (QSC)≈14 µC m-2. PLA, on the other hand is insulating (Isc≈0) and very little current could be drawn into an external circuit. In vertical contact separation TENG, voltage may increase until the air breakdown threshold is reached which results in instantaneous discharge of surface charges. As shown in FIG. 1C, the buckling of the top Teflon electrode results in a nonuniform separation distance between the top Teflon and bottom gPLA electrodes resulting in an average spacing in the range of 0.2-1 mm. According to Paschen's law, this range corresponds to air breakdown voltages 2000-5000 V suggesting that the generation of wireless signals could also be possible due to air breakdown in addition to triboelectrification.

Figure 9A:
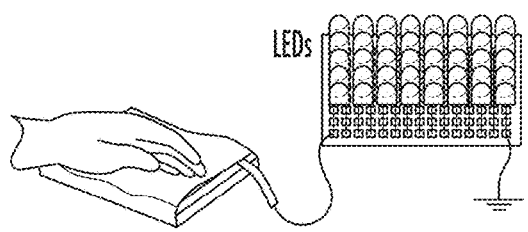
FIG. 9A and FIG. 9C illustrate schematically a presently disclosed exemplary W-TENG embodiment powering green LEDs (an exemplary 300 LED array)
Figure 9B:
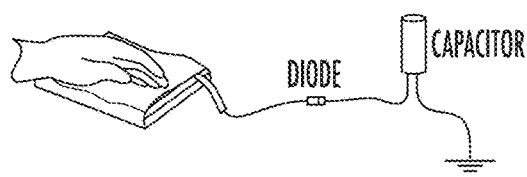
FIG. 9B and FIG. 9D illustrate charging a 10 g capacitor and response thereof in a wired configuration with a presently disclosed exemplary W-TENG embodiment.
Figure 9C:
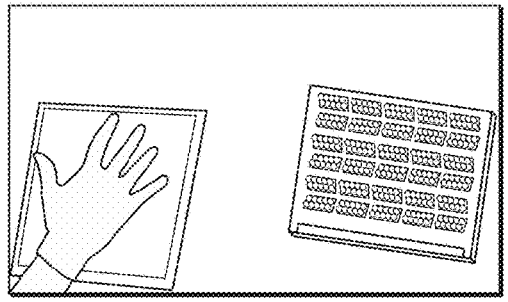
Figure 9D:
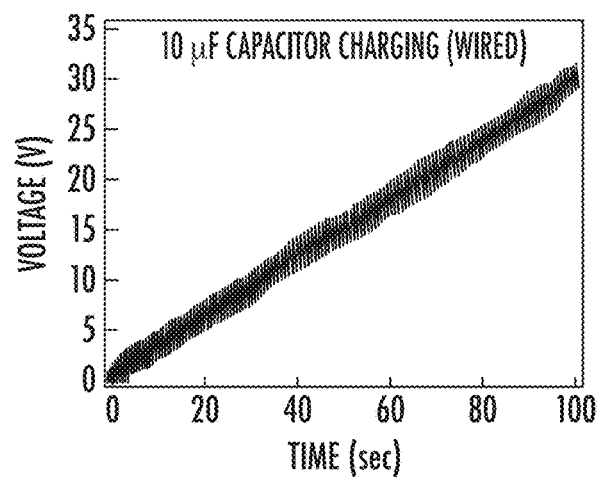

FIG. 9A and FIG. 9C illustrate schematically a presently disclosed exemplary W-TENG embodiment powering green LEDs (an exemplary 300 LED array). FIG. 9B and FIG. 9D illustrate charging a 10 g capacitor and response thereof in a wired configuration with a presently disclosed exemplary W-TENG embodiment.

As illustrated, the high electrical output of the presently disclosed W-TENG embodiment readily powers≈300 commercial green LEDs, and also can alternatively rapidly charge a 10 g capacitor to ≈30 V within 2 min. While some presently disclosed embodiments demonstrate the use of W-TENGs in self-powered wireless applications, the results of FIG. 9A, FIG. 9B, FIG. 9C, and FIG. 9D, demonstrate that achievable output characteristics (see FIG. 8A and FIG. 8B) are an improvement to the performance of previously available triboelectric nanogenerators (TENGs).

Figure 10A:
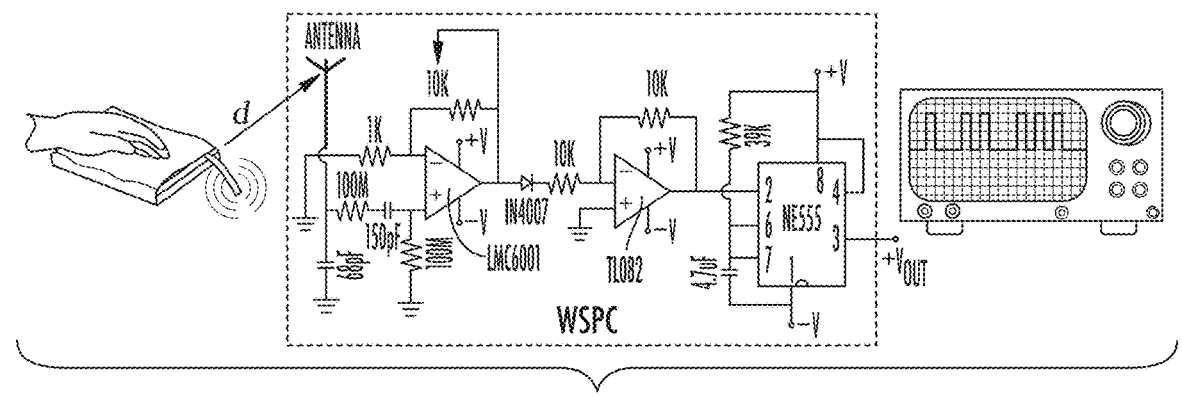
FIG. 10A illustrates a custom-built wireless signal processing circuit (WSPC) for detecting an electric field generated by a presently disclosed exemplary W-TENG embodiment, with a Cu ribbon attached to the bottom gPLA electrode thereof acting in a manner similar to an antenna for communicating with the WSPC.

FIG. 10A illustrates a custom-built wireless signal processing circuit (WSPC) for detecting an electric field generated by a presently disclosed exemplary W-TENG embodiment, with a Cu ribbon attached to the bottom gPLA electrode thereof acting in a manner similar to an antenna for communicating with the WSPC. A band-pass filter unit tuned to receive≈33 Hz frequency component of W-TENG signals is used to mitigate interference from the surrounding environment. The output of the WSPC can be coupled to a toggle relay for actuating, for example, smart home devices.

Figure 10B:
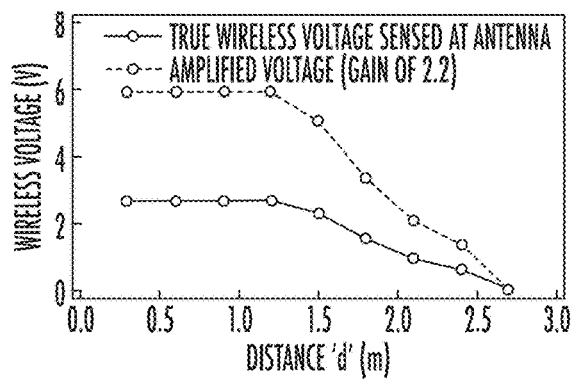
FIG. 10B illustrates the magnitude of the voltages sensed by the WSPC of FIG. 10A as a function of distance between the W-TENG and WSPC antenna (for a preamp gain of 2.2)
Figure 10C:
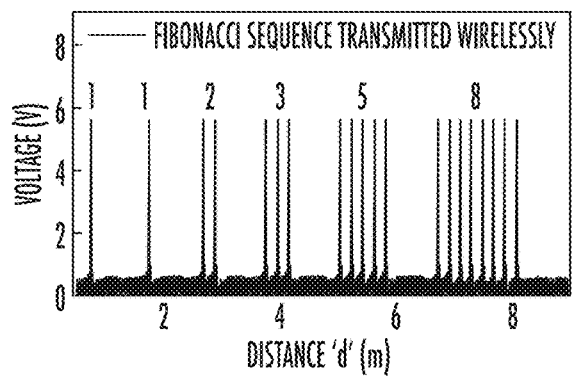
FIG. 10C illustrates representative first six numbers of a Fibonacci sequence that may be transmitted wirelessly by a presently disclosed exemplary W-TENG embodiment, with such a WSPC arrangement.

FIG. 10B illustrates the magnitude of the voltages sensed by the WSPC of as a function of distance between the W-TENG and WSPC antenna (for a preamp gain of 2.2), which illustrates spatial variation of electric field with distance of such exemplary WSPC arrangement. FIG. 10C illustrates representative first six numbers of a Fibonacci sequence that may be transmitted wirelessly by a presently disclosed exemplary W-TENG embodiment, with such a WSPC arrangement.

Clearly, the high electric field generated by the presently disclosed W-TENG embodiment is superior to prior wireless transmission models that require an external signal transmitter. Per presently disclosed subject matter, any mechanical action or pulse placing the top Teflon sheet in contact with the bottom gPLA electrode generates a large potential difference (>2 kV at the device) with an associated electric field instantaneously sensed over a distance of ≈3 m. The gentle hand tapping of the presently disclosed exemplary W-TENG embodiment is detectable in real-time as a single voltage pulse by an oscilloscope equipped with a custom-built wireless signal processing circuit or wireless signal processing circuit (WSPC) (FIG. 10A) situated within ≈3 m from the W-TENG embodiment.

Unlike prior TENG devices which are used merely to charge batteries or capacitors to power commercial wireless signal transmitters, the presently disclosed W-TENG embodiments act both as the electrical energy generator and the signal transmitter.

When the W-TENG embodiment was hand tapped in a Fibonacci sequence (i.e., 1, 1, 2, 3, 5, and 8 taps) with a ≈1 s gap between each cycle, the mechanical pulses were wirelessly detected by the WSPC as an instantaneous voltage spike with the same periodicity as the input pulses (see FIG. 10C). Such a real-time response allows the presently disclosed self-powered W-TENGs to wirelessly transmit signals (akin to Morse coding) for detection via simple and inexpensive electronic receivers. Thus, the presently disclosed W-TENGs, when configured to function as self-powered wireless controllers, are useful in smart-home applications (e.g., lights, temperature sensors, burglar alarms, smart-windows, and garage doors).

Figure 11:
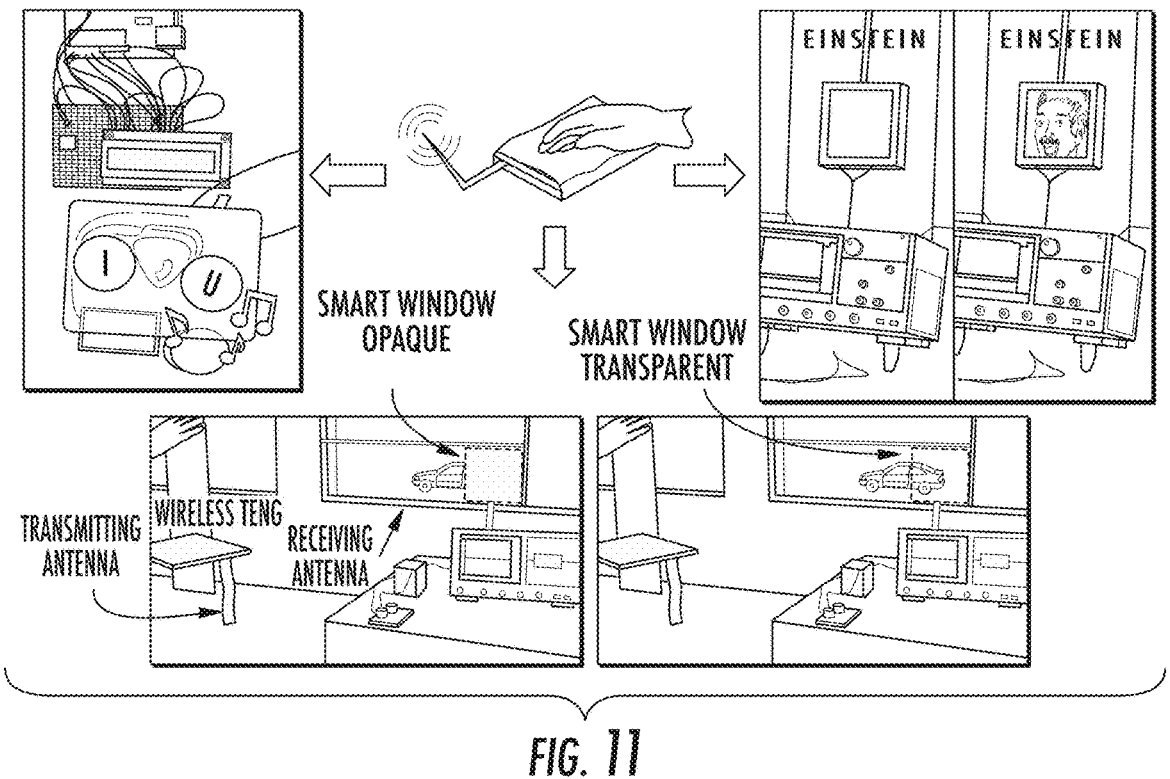

FIG. 11 represents the use of a presently disclosed exemplary W-TENG embodiment for actuating smart home applications such as, smart-tint windows, photoframes, LED displays, calling bell/security alarm, and similar. As represented in FIG. 11, it is possible to hand tap presently disclosed W-TENGs to wirelessly activate such as alarms/calling bells, lights, sensor displays, smart-windows, and photoframes. As further example, presently disclosed W-TENGs can be used to activate security systems with either a single, or a specific user-defined passcode via mechanical pulses (e.g., Fibonacci sequence).

Figure 12A:
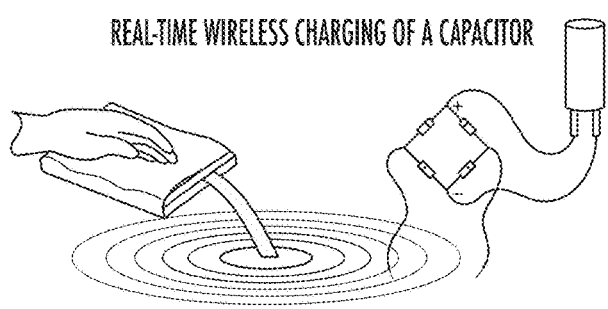
FIG. 12A illustrates an exemplary schematic for wireless charging of a capacitor in accordance with presently disclosed subject matter, whereby the ac leads of a full-wave rectifier act as an antenna and capture the energy in the electric fields generated by a presently disclosed exemplary W-TENG embodiment.

FIG. 12A illustrates an exemplary schematic for wireless charging of a capacitor in accordance with presently disclosed subject matter. Per such exemplary embodiment, the ac leads of a full-wave rectifier may act as an antenna and capture the energy in the electric fields generated by a presently disclosed exemplary W-TENG embodiment.

Figure 12B:
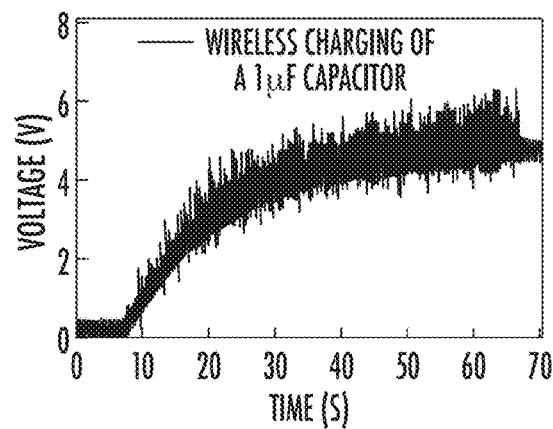
FIG. 12B illustrates a representative 1 μF capacitor being charged wirelessly to 5 V in less than a minute by hand tapping a presently disclosed exemplary W-TENG embodiment.

FIG. 12B illustrates a representative 1 µF capacitor being charged wirelessly to 5 V in less than a minute by hand tapping a presently disclosed exemplary W-TENG embodiment.

Given that the most abundant energy associated with humans is mechanical energy resulting from body motion, presently disclosed W-TENGs can be used to harvest this otherwise wasted mechanical energy (e.g., walking) to wirelessly charge energy storage devices (e.g., capacitors). While the harvested power of the example of FIG. 5B may seem relatively low, the charging achieved with presently disclosed subject matter is 100% wireless and requires no batteries. Accordingly, other embodiments could make use of a large array of presently disclosed W-TENGs integrated into walkways, roads, and other public spaces to wirelessly charge energy storage devices that can harvest this wasted mechanical energy. Given that mechanically robust presently disclosed W-TENGs can be scalably 3D printed and virtually last forever (or at least for extended usage), such large installations would be both physically feasible and economically viable.

The following highlights various presently disclosed W-TENG embodiment wireless transmission characteristics and receiver signal filtering to remove interfering signals from the surrounding environment.

The exemplary W-TENG embodiment transmits its signal using an antenna that is capacitively coupled to an antenna attached to the WSPC circuitry (see FIG. 10A). The estimated capacitance (C) between the two antennae is 1 fF at a separation of 1 m. The W-TENG embodiment output voltage is ~2.5 kV. From Q=CV (Q is charge, C is capacitance, and V is voltage), Q was calculated to be 2.5 pC. The W-TENG embodiment signal can be deconvoluted into two major frequency components (82 and 33 Hz). The W-TENG embodiment signal rise time of 14 ms coupled with Q=2.5 pC yields an average current I=Q/Δt=(2.5 pC)/(14 ms)=0.18 nA. The maximum current to be given can be computed from the maximum $dV/dt=0.54$ V/μs. Using the relation I=C (dV/dt), the v maximum current in the waveform occurs was found to be 0.54 nA. The portion of the waveform with highest peak is 2.5 kV. The waveform can be approximated using equivalent sinusoidal waveforms by inspection with two major frequency components ~82 and 33 Hz.

The following considers analysis of major frequency components present in the output voltage waveform generated by the presently disclosed exemplary W-TENG embodiment, and including frequency response of the band-pass filter incorporated in the WSPC represented in FIG. 10A. Although the rising slope of the waveform yields a larger output current, and thus a greater strength wireless signal from the W-TENG embodiment, its 82 Hz characteristic frequency would be difficult to discriminate from the commonly present 60 Hz AC wiring electromagnetic interference (EMI). Thus, use of the characteristic frequency of 33 Hz is preferable, and lends itself to effective filtering as described below.

To eliminate spurious detection at the preamplifier input in WSPC, a band-pass filter is incorporated. The band-pass filter may include passive single-pole low-pass and high-pass filter sections.

The circuit operation of band pass filter in the WSPC of FIG. 10A is as follows. The exemplary low-pass filter section may include a 68 pF capacitor from the antenna to ground. This provides −3 dB at 7.2 Hz with 6 dB/octave attenuation at higher frequencies. The high-pass section consists of a 150 pF series capacitor, and a 100 MΩ resistor to ground, giving a −3 dB at 13 Hz with 6 dB/octave attenuation at lower frequencies. The combination of high- and low-pass results in a band-pass filter with 9.3 Hz center frequency having a −3 dB (relative to center-frequency amplitude) bandwidth of 2.7 to 33 Hz, with approximately 6 dB/octave attenuation at lower and higher frequency, respectively.

With such exemplary arrangements, attenuation of possible interfering signals is as follows:

Walking past the receiver (1 Hz or less)=more than 8.8 dB;
AC line (60 Hz)=6.1 dB;
AC line harmonic (120 Hz)=10.8 dB;
AC line harmonic (180 Hz)=13.9 dB;
AC line harmonic (240 Hz)=15.9 dB;
Fluorescent light HF ballasts (>10 kHz)=more than 47 dB;
Amateur radio HF transmitter (2 MHz)=94 dB;
Wi-Fi and cell phone (900 MHz)=147 dB.

In contrast, the signal from the WTENG embodiment at 33 Hz is attenuated by 3 dB.

Such filtering is sufficient to result in a working transmitter/receiver system that prevents false positive detection arising from walking past the antenna or from 60 Hz EMI from AC wiring.

Figure 13A:
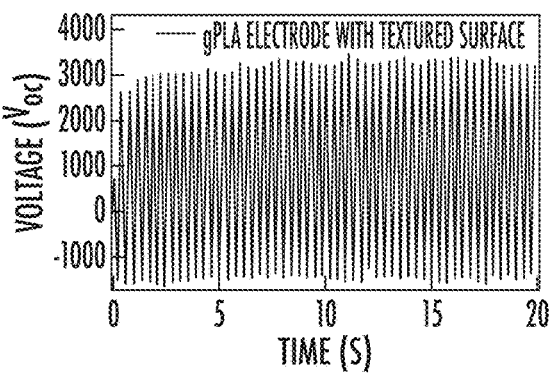
FIG. 13A illustrates exemplary open circuit voltages of ~3 kV generated by texturing the bottom gPLA electrode of a presently disclosed exemplary W-TENG embodiment for enhanced friction.
Figure 13B:
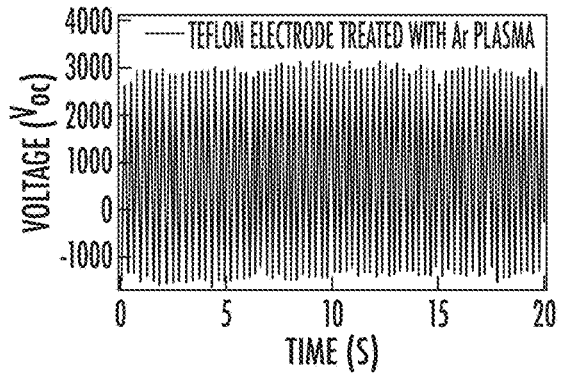
FIG. 13B illustrates exemplary open circuit voltages of ~3 kV generated by an Ar plasma treated top Teflon electrode of a presently disclosed exemplary W-TENG embodiment.

FIG. 13A illustrates exemplary open circuit voltages achieved of ~3 kV generated by texturing the bottom gPLA electrode of a presently disclosed exemplary W-TENG embodiment for enhanced friction. Similarly, FIG. 13B illustrates exemplary open circuit voltages of ~3 kV generated by use of an Ar plasma treated top Teflon electrode of a presently disclosed exemplary W-TENG embodiment.

Therefore, this demonstrates that the already high output of a presently disclosed W-TENG embodiment can be further enhanced to 3 kV via Ar plasma treatment of the top Teflon electrode, or by patterning or texturing the bottom gPLA electrodes via 3D printing. Specifically with respect to texturing (on the order of mm patterns) of the bottom gPLA electrode, the resulting enhanced friction contributes to converting mechanical energy into electricity, and wirelessly transmitting obtained energy into storage devices (e.g., capacitor).

FIG. 14 represents exemplary spatial variation of an exemplary electric field generated by a presently disclosed exemplary W-TENG embodiment as a function of distance.

FIG. 15A and FIG. 15B show, respectively, electric field distribution in a presently disclosed exemplary W-TENG embodiment without (FIG. 15A) and with (FIG. 15B) an attached Cu ribbon. As illustrated, clearly, the presence of the Cu ribbon attached to the bottom gPLA electrode assists in accumulation of triboelectric charges with a concentrated strong electric field in its vicinity. Thus, the Cu ribbons acts similar to an antenna for transmitting W-TENG signals to the wireless signal processing circuit (WSPC).

Figure 16A:
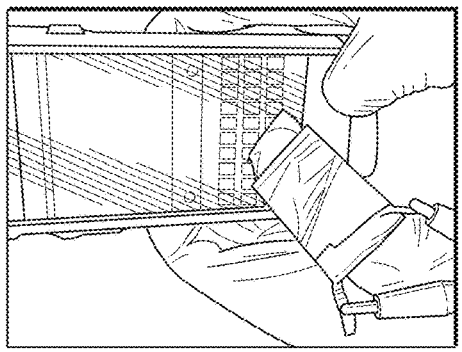
FIG. 16A, FIG. 16B, FIG. 16C, FIG. 16D, FIG. 16E, and FIG. 16F illustrate arrangements and results for utilizing various mechanical activities for harvesting wasted mechanical energy by using a presently disclosed exemplary W-TENG embodiment, including in association with typing at a keyboard (FIG. 16A and FIG. 16D), using a mouse (FIG. 16B and FIG. 16E), and texting (FIG. 16C and FIG. 16F).
Figure 16B:
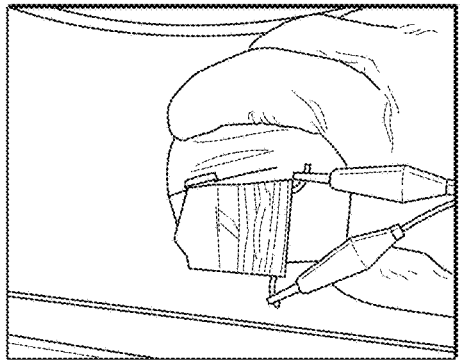
Figure 16C:
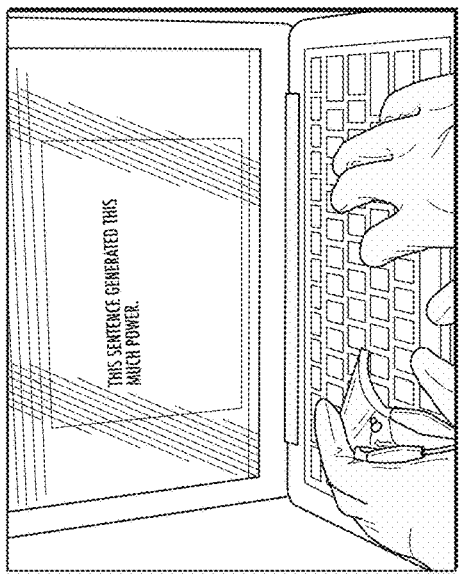
Figure 16D:
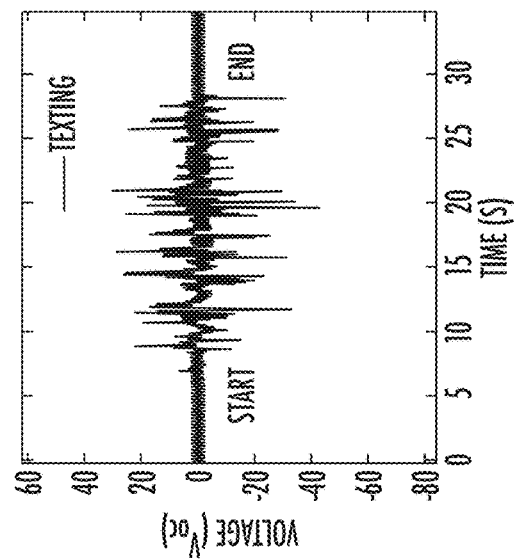
Figure 16E:
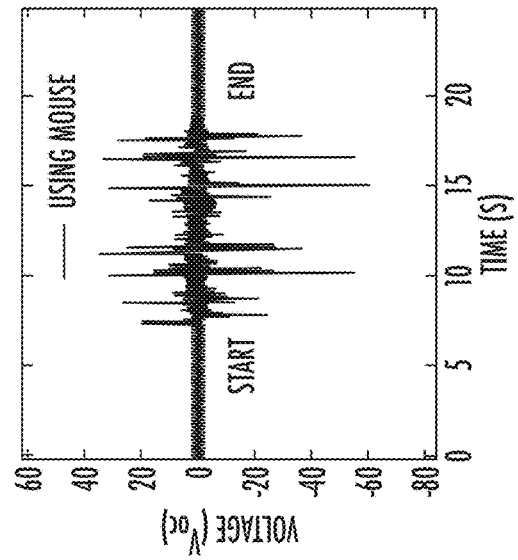
Figure 16F:
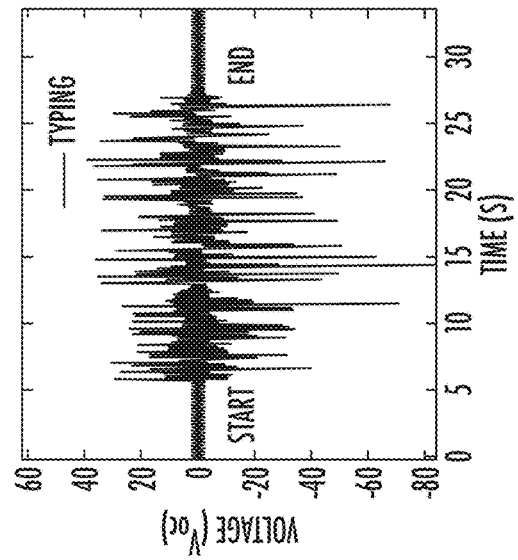

FIG. 16A, FIG. 16B, FIG. 16C, FIG. 16D, FIG. 16E, and FIG. 16F illustrate arrangements and results for utilizing various mechanical activities for harvesting wasted mechanical energy by using a presently disclosed exemplary W-TENG embodiment, including in association with typing at a keyboard (FIG. 16A and FIG. 16D), using a mouse (FIG. 16B and FIG. 16E), and texting (FIG. 16C and FIG. 16F).

Estimation of applied mechanical force through hand tapping has been previously analyzed per Richard Kaye and Stephan Konz, Volume and Surface Area of the Hand, Proceedings of the Human Factors and Ergonomics Society Annual Meeting, Volume: 30 issue: 4, page(s): 382-384 (fully incorporated by reference). Per such materials, an average human hand has a density of 1.09 g/cm3 and a mass of ~0.4 kg. The average tapping velocity used before impact was ~3 m/s. The momentum is therefore ~1.2 kgm/s. It is known from the rise time of the pressing pulse that the time elapsed for the hand to reach zero velocity is ~0.010 s. The average force is therefore Δp/Δt≈1.2/0.010=120 N. The average working frequency for the activation of the W-TENG embodiment in disclosure herewith was ~3.5 Hz.

The following outlines an exemplary construction of one embodiment of a presently disclosed exemplary W-TENG embodiment.

A 3D printer such as the Prusa i3 3D printer may be used for additively manufacturing TENGs using gPLA filaments. A borosilicate heat-print-bed glass maintained at 70° C. was used as the bottom supporting substrate (see FIG. 1A, FIG. 1B, FIG. 1C, FIG. 2A, FIG. 2B, FIG. 2C, FIG. 2D, FIG. 2E, and FIG. 2F). A thin polyimide film was first attached to the top surface of the bed glass, followed by extrusion of the gPLA filament at 220° C. and layer-by-layer printing on the polyimide film through the fused deposition model. Due to the characteristic that gPLA have poor affinity for glass, a buffer sheet of polyimide was preferably intentionally used in the 3D printing process, or otherwise the printed features would tend to potentially warp and peel off the bottom bed glass substrate. A copper ribbon ($\approx$25 cm×2.5 cm×0.05 mm) was attached to the gPLA electrode to serve as a wireless transmitter, and a Teflon sheet having a thickness of 0.25 mm was used as the top electrode (FIG. 2D).

Micro-Raman spectroscopy was performed on the gPLA electrodes using a Renishaw micro-inVia spectrometer (514.5 nm Ar+ ion laser excitation, 50× objective and Peltier-cooled CCD). Scanning electron microscopy (SEM, Hitachi S4800) and thermogravimetric analysis (TGA, Q500 system from TA instruments, in flowing nitrogen) were also performed, and the output voltages were measured using a Yokogawa DL 9710L digital oscilloscope. For voltage measurements of W-TENG, a 10 MΩ oscilloscope probe was used.

The custom-built wireless signal processing circuit (WSPC, see FIG. 10A) was used for the wireless detection of W-TENG output signals. The WSPC included a preamplifier or preamp (LMC6001), an intermediate amplifier (TL082), and a pulse-shaping integrated circuit or IC (NE555). A band-pass filter consisting of passive single-pole low-pass and high-pass filter sections as described herein was used for mitigating interference from the surrounding environment. To this end, the low- and high-pass filters were chosen so as to selectively couple with $\approx$33 Hz frequency component in W-TENG embodiment signals. A high pass filter with a 150 pF series capacitor (needed to mitigate the interference from the surrounding electric fields) and a 100 MΩ resistor (characteristic roll-off frequency of $\approx$5 Hz) was used as the high impedance input to the preamp. The preamp was configured with a gain of $\approx$2.2.

Although W-TENGs produce both negative and positive pulses upon pressing and releasing, the amplitude of the positive voltage pulse in our case was 4-fold larger than the negative pulse. Thus, only the positive pulse was retained from the preamp output, which was passed through a Si-diode for signal rectification. The intermediate amplifier was configured as an inverting amplifier with unity gain to make the rectified signal compatible with the pulse shaping IC's trigger input.

Finally, a 555 timer with pulse shaping IC was configured to operate in a one-shot monostable mode, which upon being triggered produces a 12 V square pulse of $\approx$0.2 s duration (a signal compatible with the toggling relay trigger input). The 0.2 s duration of this one-shot output eliminates any input pulse "bounce" (from the oscillation of W-TENG electrode after mechanical activation) that might be present in the time window of 0.2 s. The output duration of the pulse from the 555 timer can be adjusted by modifying the values of the capacitor and resistor connected in series between pins 1 and 8. When the negative trigger pulse from the inverting amplifier is applied to pin 2 of the 555 timer, the voltage across the capacitor (4.7 μF attached to 39 kΩ; RC$\approx$0.2 s) increases exponentially for a period of $\approx$0.2 s. Subsequently, the output drops to a "low". Thus, the W-TENGs in this exemplary embodiment were designed to transmit wireless signals with a minimum spacing of $\approx$0.2 s.

In broad summary, fused deposition modeling was used for the additively manufacturing or 3D printing of PLA-based TENGs on a polyimide film. The addition of graphene filler to PLA improved the electrical conductivity of the printed gPLA electrode, which improved the W-TENG performance with output voltages >2 kV and output powers of $\approx$70 mW.

The resulting high electrical output of exemplary W-TENG embodiments can readily power$\approx$300 commercial green LEDs and also rapidly charge a 10 μF capacitor to $\approx$30 V within 2 min. The high voltage output of W-TENG embodiments generate strong electric fields enabling wireless transmission without any external signal transmitters. In this regard, W-TENG embodiments represent very useful self-powered transmitters for securely actuating smart-home applications (e.g., lights, temperature sensors, burglar alarms, smart-windows, and garage doors) upon receiving a specific sequence of mechanical pulses (i.e., a secure passcode). W-TENG embodiments also permit the unprecedented wireless harvesting of mechanical energy, namely, a 1 μF capacitor wirelessly charging to 5.0 V within a minute using a W-TENG embodiment triggered by handtapping.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A triboelectric nanogenerator (TENG), comprising:
a pair of oppositely facing bottom and top electrodes of dissimilar materials for producing contact induced electrostatic potential across the surfaces of said electrodes to convert mechanical energy applied thereto into usable electrical energy;
wherein said bottom electrode comprises a combination of graphene and one of polylactic acid (PLA) and a polymer formed as a graphene nanocomposite on a substrate;
said top electrode comprises one of Teflon, Polyvinylidene fluoride, two-dimensional Ti2C3Tx, and fluorographene;
said TENG further includes a metallic ribbon attached to said bottom electrode to function as an antenna for directly wirelessly transmitting electrical energy from said TENG to an associated receiving wireless device;
said ribbon comprises a copper ribbon;
said substrate comprises a glass substrate;
said top electrode comprises a Teflon sheet; and
said graphene is combined with PLA to form a gPLA nanocomposite which is 3D-printable on said substrate.

2. A triboelectric nanogenerator (TENG) as in claim 1, further comprising a layer of polyimide between said substrate and said gPLA nanocomposite.

3. A triboelectric nanogenerator (TENG) as in claim 1, wherein said polymers combined with graphene include one of Polyethylene terephthalate, Polycarbonate, Acrylonitrile Butadiene Styrene, and nylon.

4. A triboelectric nanogenerator (TENG) as in claim 1, wherein the size of said substrate is matched with the size of said TENG, for maximizing available mechanical energy harvesting of said TENG.

5. A triboelectric nanogenerator (TENG) as in claim 1, wherein the associated receiving wireless device is one of a sensor to be actuated and a device to be charged.

6. A triboelectric nanogenerator (TENG) as in claim 5, wherein said device to be charged is one of a capacitor and a battery.

7. A triboelectric nanogenerator (TENG) as in claim 1, wherein said top electrode is buckled relative to said bottom electrode so as to form an air gap therebetween.

8. A self-powered wireless triboelectric nanogenerator (W-TENG), comprising:
- a substrate;
- a pair of oppositely facing bottom and top electrodes of dissimilar materials comprising nano carbon and polymer based electrodes; and
- a metallic ribbon antenna associated with said bottom electrode for directly wirelessly transmitting electrical energy from said W-TENG to an associated receiving wireless device, without any active power supply, based on contact induced electrostatic potential across the surfaces of said dissimilar materials electrodes to convert mechanical energy applied thereto into usable electrical energy;
- wherein said bottom electrode comprises a combination of graphene and polylactic acid (PLA) formed as a graphene nanocomposite (gPLA) on said substrate;
- said top electrode comprises one of Teflon, Polyvinylidene fluoride, two-dimensional Ti2C3Tx, and fluorographene; and
- said bottom electrode comprises a 3-D printed layer.

9. A self-powered wireless triboelectric nanogenerator (W-TENG) as in claim 8, further comprising a layer of polyimide between said substrate and said graphene nanocomposite.

10. A self-powered wireless triboelectric nanogenerator (W-TENG) as in claim 8, wherein said substrate comprises glass, and said top electrode is buckled relative to said bottom electrode so as to form an air gap therebetween of at least 1 mm.

11. A self-powered wireless triboelectric nanogenerator (W-TENG) as in claim 8, further combined with an electrical load comprising the associated receiving wireless device, for receiving and using said transmitted electrical energy.

12. A self-powered wireless triboelectric nanogenerator (W-TENG) as in claim 8, further combined with a wireless signal processing circuit for detecting an electric field transmitted by said self-powered wireless triboelectric nanogenerator.

13. A self-powered wireless triboelectric nanogenerator (W-TENG) as in claim 8, wherein said top electrode comprises an Ar plasma treated Teflon electrode.

14. A self-powered wireless triboelectric nanogenerator (W-TENG) as in claim 8, wherein said bottom electrode comprises a graphene nanocomposite (gPLA) formed on said substrate as a textured surface for relatively enhanced frictional engagement thereof.

15. A triboelectric nanogenerator (TENG), comprising:
- a pair of oppositely facing bottom and top electrodes of dissimilar materials for producing contact induced electrostatic potential across the surfaces of said electrodes to convert mechanical energy applied thereto into usable electrical energy;
- wherein said bottom electrode comprises a combination of graphene and one of polylactic acid (PLA) and a polymer formed as a graphene nanocomposite on a substrate; and
- said top electrode comprises one of Teflon, Polyvinylidene fluoride, two-dimensional Ti2C3Tx, and fluorographene;
- wherein said graphene is combined with PLA to form a gPLA nanocomposite which is 3D-printable on said substrate; and
- said triboelectric nanogenerator further comprises a layer of polyimide between said substrate and said gPLA nanocomposite.

* * * * *